United States Patent [19]

Fischer

[11] Patent Number: 4,688,519
[45] Date of Patent: Aug. 25, 1987

[54] APPARATUS AND METHOD FOR REARING AQUATIC SPECIES

[76] Inventor: Joseph Fischer, 2939 NW. 43rd Ave., Gainesville, Fla. 32605

[21] Appl. No.: 888,284

[22] Filed: Jul. 24, 1986

Related U.S. Application Data

[63] Continuation of Ser. No. 628,334, Jul. 6, 1984, abandoned.

[51] Int. Cl.$^4$ ............................................. A01K 63/00
[52] U.S. Cl. ........................................................ 119/3
[58] Field of Search ................................... 119/2, 3, 4

[56] References Cited

U.S. PATENT DOCUMENTS

| | | | |
|---|---|---|---|
| 3,716,026 | 2/1973 | Gross | 119/3 |
| 4,221,187 | 9/1980 | Casey | 119/3 |
| 4,369,735 | 1/1983 | Van Gaalen | 119/3 |
| 4,414,919 | 11/1983 | Hess | 119/3 |

FOREIGN PATENT DOCUMENTS

| | | | |
|---|---|---|---|
| 2497063 | 7/1982 | France | 119/2 |
| 1026733 | 7/1983 | U.S.S.R. | 119/3 |

*Primary Examiner*—Robert P. Swiatek
*Attorney, Agent, or Firm*—Hamilton, Brook, Smith & Reynolds

[57] ABSTRACT

An apparatus and method for rearing aquatic species by employing a tank with a bottom surface having an arcuate shape are disclosed. An oscillating circulatory bottom member is provided to resuspend particulate matter, to aerate water within the tank, and to provide additional water or to drain water from the tank.

5 Claims, 12 Drawing Figures

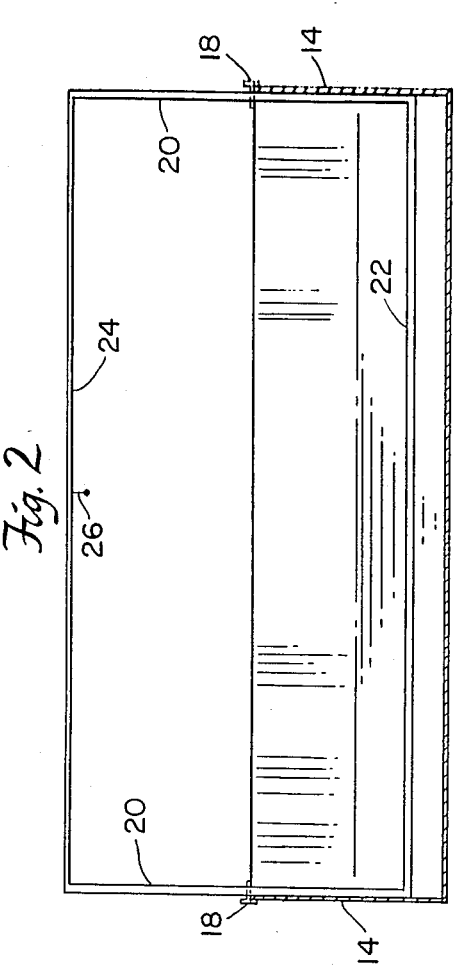
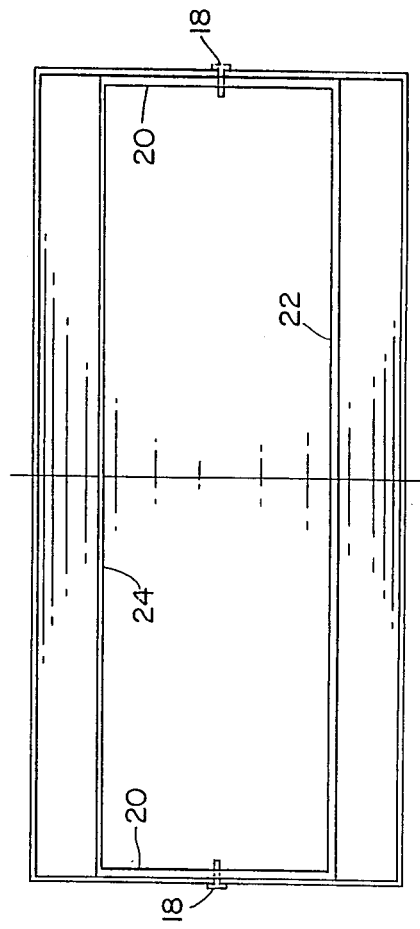
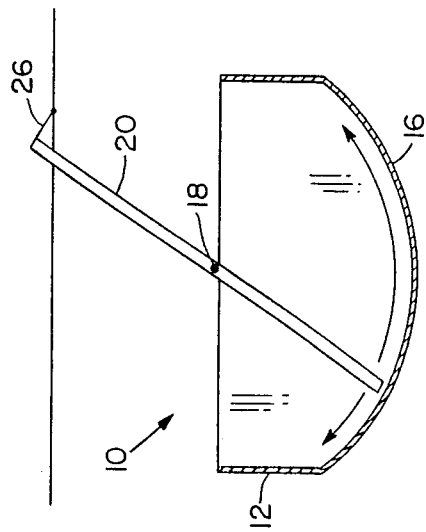

APPARATUS AND METHOD FOR REARING AQUATIC SPECIES

This is a continuation of co-pending application Ser. No. 628,334 filed on July 6, 1984, and now abandoned.

TECHNICAL FIELD

This invention is in the field of aquatic culture systems.

BACKGROUND ART

There have been many efforts to rear aquatic species, such as shrimp larvae, post-larvae, other aquatic species larvae and juveniles. In order to successfully rear such aquatic species, careful control over the environmental conditions present in the rearing tank is necessary.

For example, the oxygen content of the water employed must be maintained at a suitable level. Additionally, a tank containing such species must be provided with superior water circulation and must have means for the removal of wastes. It is also important to agitate the entire tank bottom so that settled food particles will be resuspended and thereby become available to the growing aquatic species.

A number of systems for raising fish, shrimp and other aquatic species have been described in the patent literature. U.S. Pat. No. 3,653,358, for example, discloses a floating growing tank for fish having a closed water-tight liner filled with water and immersed in a relatively large body of water with a protective mesh surrounding the liner. A plurality of such tanks can be grouped around a service platform to provide a system for growing fish.

U.S. Pat. No. 3,886,902 discloses a recirculating fish raising tank with cleaning brushes for stirring up waste material on the bottom of each tank and filters which allow droppings to pass while retaining growing fish.

U.S. Pat. No. 4,064,836 describes an aquatic tank having flexible tank means in a shape of a closed bag held in place by a frame.

U.S. Pat. No. 4,211,183 discloses an apparatus including a fish tank with a biological filter submerged in it so that water can be recirculated through the biological filter to remove ammonia.

U.S. Pat. No. 4,221,187 discloses a rectangular tank for raising fish equipped with means for providing laminar flow through the tank and having sweeper means for removing particulate matter from the bottom of the tank.

U.S. Pat. No. 4,368,691 discloses a flowing bed method for employing loose solid particles for the removal of waste from aquatic organisms.

DISCLOSURE OF THE INVENTION

This invention relates to an apparatus and method for rearing aquatic species, such as shrimp larvae, post-larvae, other aquatic species larvae and juveniles. Tank means are provided for containing a supply of water sufficient to rear the aquatic species of interest. The tank means has a bottom surface arcuate in shape and a bottom member extends horizontally along the bottom surface of the tank means. Means for mounting the bottom member to the tank means so that the member has an oscillating motion are employed. Finally, means for driving the bottom member in an oscillating manner are used whereby the bottom member sweeps along the bottom of the tank means thereby resuspending food particles contained at the bottom of the tank means. The bottom member can also be used to aerate the tank and to add or remove water therefrom.

The interrelationship between the arcuate shape of the tank bottom and the pathway of the oscillating member provide an overall enhanced effectiveness of a system for raising aquatic species. Inert particles, such as food, are resuspended and dead spots are eliminated at the tank bottom. This minimizes the probability of disease. The oscillating member at the bottom of the tank also provides superior water circulation and can also be designed to remove waste and provide aeration thereby maintaining acceptable water quality for the growing aquatic species.

BRIEF DESCRIPTION OF THE FIGURES

FIG. 1 is a cut-away end view of a tank suitable for use with this invention;

FIG. 2 is a cut-away side elevational view of the tank of FIG. 1;

FIG. 3 is a plan view of the tank of FIG. 1;

DETAILED DESCRIPTION OF THE INVENTION

Figure 4:
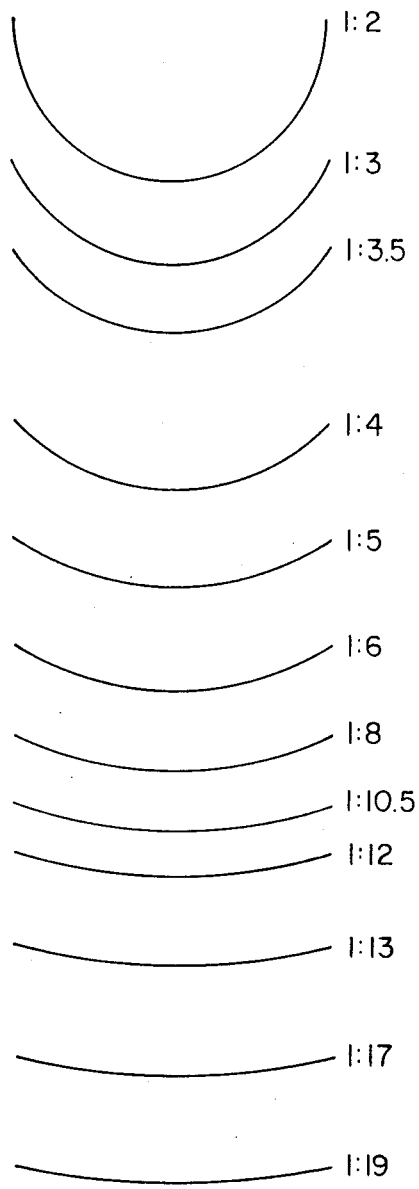
FIG. 4 is an illustration of a variety of tank bottom curves.
Figure 5:
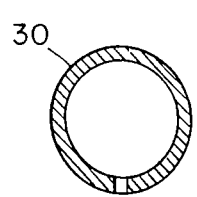
FIGS. 5–12 are cut-away end and side views of various embodiments for the bottom member of an oscillating circulatory assembly according to this invention.
Figure 6:
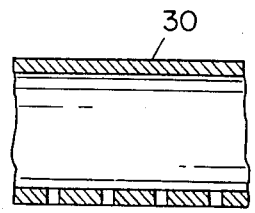
Figure 7:
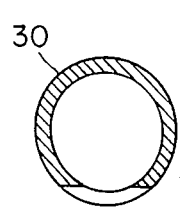
Figure 8:
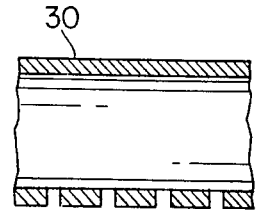
Figure 9:
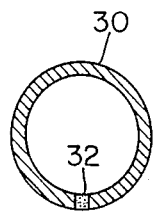
Figure 10:
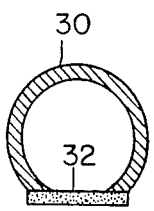
Figure 11:
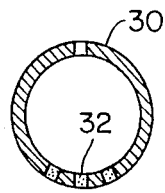
Figure 12:
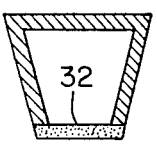

One embodiment of a culture tank 10 suitable for the present invention is illustrated in FIGS. 1–3. This tank 10 has vertical side walls 12 and end walls 14 and a smoothly curved concave bottom surface 16, representing a portion of, and conforming to, the shape of a cylinder.

Such tanks may be constructed of many different materials. For example, such tanks may be formed from epoxy over cement, fiberglass, fiberglass over wood, and P.V.C. plastic liner over a wood structure.

In addition, conventional square or rectangular concrete tanks can be converted to a design of this invention by subdividing the tank with additional walls so that an appropriate size is formed. A properly sized P.V.C. liner can then be installed into the space and the empty space beneath the curved bottom of the liner can be filled with water by a separate in-flow pipe while simultaneously filling the liner. The level of water in the under-curve dead space must remain at, or higher than, the level of water within the liner, lest the liner undergo stress and possible rupture. Care must also be taken to prevent spurious drainage of the under-curve space and to concurrently drain tank and under-curve space during the last stages of a tank harvest.

An oscillating circulatory assembly is provided in the tank as follows. Pivot pins 18 are mounted from each end wall 14 of the tank above the maximum water height and at the center line. Vertical supporting members 20 are mounted on these pivot pins. This can be achieved by drilling a series of spaced holes in the vertical supporting members 20 and then inserting the pivot pins 18 into any one of these holes. A bottom member 22 extends horizontally across the length of the curved tank bottom 16 and is attached to the pivotally mounted vertical supporting members 20. An apical horizontal connecting member 24, which may be a simple nylon line, is attached to the upper end of the vertical supporting members 20. A thinner line 26, at the center of the apical connecting member 24, is provided for attachment to a drive mechanism which moves alternately back and forth a predetermined distance and at a predetermined rate at right angles to the lengthwise axis of the tank center line. This movement results in an oscillation of the horizontal tank member 22 across the curved tank bottom 16.

The bottom member 22 can have a variety of design configurations and purposes. In a simple embodiment, it can consist of a simple P.V.C. pipe with two downward oriented strips of air-permeable plastic extending the length of the member.

The bottom tank member 22 is also weighted with plastic coated lead weights so that it is slightly heavier than the surrounding water, even when it is filled with air. Air can be supplied to the oscillating circulatory assembly by means of a flexible plastic hose extending from one tank end from a valved supply pipe.

In one method of operation, the overhead drive mechanism moves in one direction, pulling the thin connecting line 26, which attaches to and pulls the horizontal connecting member 24. This attaches to and pulls the top end of the supporting members 20. Due to the pivot point insertion, the horizontal tank member 22 moves in the opposite direction of the drive mechanism line and sweeps along the tank bottom 16. The drive mechanism reverses direction at the end of one sweep, which normally brings the horizontal tank member 22 to one side of the curved tank bottom 16. The horizontal tank member 22 then sweeps in the opposite direction. This oscillation takes into account the effect of the play of the flexible thin connecting line 26 and apical horizontal connecting member 24, and continues at a determined cycle and rate. Aeration and/or water inflow, selectively, from the oscillating circulatory assembly horizontal tank member agitates settled particles, resuspends them from the tank bottom, and in the case of aeration, maintains a superior varying circulatory pattern in the water column.

The invention is, of course, not limited to the specific tank and oscillating circulatory assembly illustrated in FIGS. 1-3. For example, the supporting members can be higher or lower than the outline of a circle defining the tank bottom curve. When the pivot point is above the level of the top of the tank sides, the apical horizontal connecting member 24 can attach below the pivot point. In special applications, the pivoting pins 18 can be mounted slightly above the center line of a cylinder formed by extending the curve of the tank bottom. This provides the bottom member with an oscillating movement which is not concentric with the tank bottom curve.

With the pivot points at the cylinder center line and with the vertical members adjusted so that horizontal tank member oscillates in contact or in extremely close proximity with the tank bottom, the air and/or water out-flow from the bottom member serves to agitate and resuspend settled particles. The combined effect of an oscillating member resuspending food particles by means of air and/or water out-flow, and of the curved surface over which the oscillating member travels, provide efficient resuspension of inert particles. The bottom member either resuspends particles or pushes particles along the curved bottom. Those particles initially pushed will be briefly reexposed to the resuspending air and/or water forces from the bottom member at an angle favoring resuspension. With no dead spots and a full sweeping action, particles ultimately resuspend.

By shortening the distance between the pivot points and bottom member, slow oscillation of the bottom member can be provided to achieve water circulation without bottom agitation. This can be used for bottom-dwelling stages of aquatic species, such as shrimp postlarvae and intermittently in larval culture, as when shrimp larvae undergo a uniform molt and are best left undisturbed. The ballast on the bottom member can be adjusted to obtain approximate neutral buoyancy to minimize sagging of the bottom member.

In a preferred configuration, the oscillating circulatory assembly is driven by a flexible mechanical linkage attached to a motor driven sprocket. Selectively, one reversible rotation electric motor or two single rotational electric motors set to turn sprockets in opposite directions can be employed. A chain driven by the sprocket can be attached to a braided nylon line extending centrally above the culture tanks. The thin line extending from the apical connecting line connects to this nylon driving line.

Appropriate linkage and trip switches reverse the sprockets' rotational direction when the bottom member reaches the end of a sweep. The flexibility of the nylon line, connections and P.V.C. supporting members allows for continued operation in case of obstruction in the tank, eliminating the potential of system breakage or shutdown in the case of rigid mechanical linkages. Additionally, the thin line connecting the horizontal apical line to the nylon driving line will break before system overload or damage occurs.

In a large production facility, a series of culture tanks can be arranged in rows and their respective oscillating circulatory assemblies driven by a plurality of motor driven sprockets.

As previously mentioned, the oscillating circulatory assembly contains lead weights or other inert ballast within or around the bottom member and/or supporting members. This maintains proper bottom contact and proper oscillating movement and, in case of disconnection from the drive mechanism, serves to return the assembly to a vertical center position in the tank.

Optionally, scrape guards and/or rollers may be installed at appropriate intervals to protect the oscillating member in the tank bottom surface or to lower friction between the bottom member and tank bottom.

In long expanses, additional braces or supports may be installed centrally along the tank length to provide more support for the assembly.

In preferred embodiments, supply lines of air and water, and a drain line for water, connect by means of flexible plastic tubing to the vertical support members and to the bottom member. Swivel valves or other connection devices could also be employed.

As needed, the oscillating circulatory assembly can be provided with scraping or scrubbing pads to scrape and clean the tank bottom. These may be utilized alone, or in combination with aeration, water in-flow or water out-flow.

Since the water depth and consequent ambient pressure differ between the sides and center of the curved tank bottom, air flow output from the bottom member with constant input pressure will be higher at the sides than at the center of the oscillating stroke. Several modifications can counterbalance this differential air flow, if desired. One factor to be considered in this regard is the shape of the curve at the tank bottom. The more slight the curve, the less the vertical height difference between the sides and center of the tank and the smaller the air flow difference. The shallower slope, however, is less desirable in terms of particle resuspension and animal harvest, so a balance of these factors should be considered.

If differential air flow presents a problem, these effects can be minimized or eliminated by a variety of techniques. For example, an elliptical drive sprocket can be utilized so that the rate of movement of the bottom member is slower in the center and more rapid at the ends of the oscillating travel. Thus, the higher rate of air flow toward the tank bottom sides with last a relatively shorter period of time than the lower flow rate at the center of the tank bottom.

The elliptical sprocket is useful in other situations in which a differential rate of assembly movement between center and peripheral regions of the tank bottom is desired. Alternatively, a mechanical linkage or programmed electronic relay which controls an air flow valve to the culture tanks, or selectively to a blow-by exhaust valve, can directly and gradually decrease air pressure as the assembly approaches the sides of the tank bottom to gradually increase air pressure as the assembly travels to the center of the tank bottom. This compensates for the tank water height and consequent pressure differences and results in even air flow.

A time or other programmable control mechanism can selectively modify the rate of oscillation of the assembly to establish patterns of movement favorable to the culture organism and feeding regime. For example, a slowly settling feed material that does not agglomerate can be kept in suspension suitably by periodic sweeps of the assembly. The assembly remains stationary at the tank bottom center or sides and oscillates fully at specified periods.

Alternatively, a rapidly settling feed, with high specific gravity, may require patterns such as continuous and more rapid assembly oscillation and rate of aeration; or slow oscillation with periodic rapid oscillation; or periodic rapid oscillations between longer periods of stationary assembly position at the center or sides. The specific pattern will depend on the species, the stage, health, condition and density of the species, the water quality, amount of non-feed particles and the type of food in the tank.

In a production facility having a row of culture tanks, a plurality of independent motor drives and associated sprockets drive respectively different culture tank oscillating circulatory assemblies having different stages of organisms, different species and/or different feeding regimes. These require different oscillation regimes. Some key factors are: time of one oscillation cycle; differential rate of movement when at the sides and center of the tank bottom; alternating time periods of oscillation and non-oscillation; partial oscillation along the tank bottom; and variable pattern of oscillation, e.g., a computer programmed gradually widening sweep of oscillation.

In a particularly preferred embodiment, the arcuate shape of the bottom of the tank is a section of a true cylinder. In a side view, this conforms to the section of a circle. This can be seen in FIG. 4 which illustrates a range of bottom curves based on cylinders. Given the difficulty of drive mechanism linkage for bottom curves or or near one-half the circumference of a circle (1:2), and given the particle resuspension problems with very shallow curves (e.g., 1:19), the preferred range of bottom curves is less than one-half and greater than one-tenth of the circumference of a circle. In a particularly preferred configuration of the invention, the curved bottom portion of the tnak represents approximately one-third of the circumference of the cylinder or cross-section view circle from which it is delineated.

The bottom member 22 of the oscillating circulatory assembly can be formed from a number of different materials. It can have a number of different designs to achieve its purposes. Some of these will now be further discussed.

A simple embodiment of the bottom member is illustrated in FIGS. 5 and 6. Therein, a simple tube 30, such as P.V.C. tubing, is provided with holes to allow air or water to flow out from or into the bottom member. Alternatively, slits may be provided as shown in FIGS. 7 and 8.

The holes of FIGS. 5 and 6, or the slits of FIGS. 7 and 8, can additionally be covered with a strip of air-permeable material 32, such as porous polyethylene tubing as illustrated in FIGS. 9 and 10 respectively.

FIG. 11 illustrates a variation in which a plurality of holes, each covered by air-permeable material 32 are provided in a bottom member. Note that one hole is positioned at the top of the member so that air is directed upwardly.

The horizontal bottom member need not be circular, of course. FIG. 12, for example, illustrates a truncated triangle provided with a strip of air-permeable material at its bottom to enhance the air-lift effect upon settled particles.

A water drain member may be provided in the bottom member, such as by covering exit holes with screening to prevent loss of culture organisms. This permits the exit of undesirable food and waste particles with draining force provided by syphon, suction or pumping. The drain member may selectively extend the entire length of the bottom member or be of shorter configuration. The drain member can operate solely, with air and/or water in-flow not simultaneously operative, apart from simultaneously operating air and/or water in-flow, or selectively, near air and/or water in-flow bars so there is partial self-cleaning action. The choice of configurations depends on tank conditions and operational capabilities.

The bottom member may also be provided with fixed or moveable vanes in proximity of air and/or water in-flow thereby serving to direct air and/or water, and particle flow upward.

Experiments were conducted employing the methods and apparatus of this invention, as follows. Fiberglass over wood tanks were filled to approximately 200 liters with water. Each tank had dimensions approximately 38 cm. long, 100 cm. wide, and 49.5 cm. height at side wall. Water height for 200 liter volume was 42 cm. at sides and 57.2 cm. at center of the bottom curved surface. The ratio of the arc length of the circle defining its curve was approximately 1:5. A mechanical linkage drove the oscillation of an oscillating circulatory assembly similar to that shown in FIGS. 1–3 powered by a geared-down, low speed electric motor. Two rotating discs converted rotational to linear oscillating motions, respectively with two bars connecting from the discs' edges to a horizontal brace across the OCA vertical member, below the pivot point. The OCA bottom horizontal member was a single, downward-directed strip of air-permeable plastic adhered to a slotted half inch diameter P.V.C. pipe.

Inert feed particles with a 115 microns approximate mean diameter were added to four tanks each filled to 200 liter volume. The OCA was adjusted and set to move fully from one side to the opposite side and back, to complete one oscillation every five minutes. At this rate over 90% of the feed particles were present in the water column at all times, and the trial ended after 20 hours. The feed level used, 0.04 g/liter, was over twice the normal feeding level for shrimp larvae in order to test the system with a high density of particles.

Inert feed particles of 115 micron approximate mean diameter were added in incremental amounts to three 200 liter tanks to further test the effect of particle density on resuspension capability. Particle density did not affect the suspension capabilities of the tank system over the range tested. Oscillation rate during the trial was once every five minutes. After data collecton for 4 g/tank, the oscillation was stopped, with the OCA set in the center bottom position. After two hours in this stationary position, particle density in the water column declined an average of ten percent. A rapid oscillation, after the two hour stationary period, brought clumps of particles from the tank bottom into the water column. These clumps were not observed during continuous oscillation at the normal rate.

Larvae of the marine shrimp, *Penaeus vannamei*, were cultured in one tank, providing only inert feed particles during the mysis stages. Stocking density was 50 larvae per liter, and standard hatchery routines and parameters were maintained. Through late mysis, the larvae had approximately the same rate of metamorphosis and growth as controls fed live *Artemia nauplii*, and population estimates indicated over 90% survival. This compared very closely to control population estimates.

Larvae of the marine shrimp, *Penaeus vannamei*, obtained from captive brookstock, were cultured from early mysis stages to fifth day post-larvae. Standard hatchery routines and parameters were maintained. Stocking density averaged 61 larvae per liter, and survival averaged 64%.

These experiments demonstrated that shrimp larvae are not harmed by the action of the oscillating circulatory assembly, and in fact grow very well in the tank environment.

Inert feed particles were added to a tank with the oscillating circulatory assembly oscillating in close proximity with, and in places in contact with, the curved bottom surface. Over 90% of the particles were maintained in suspension. Then the oscillating circulatory assembly pivot position was raised 1 cm. so the oscillating circulatory assembly horizontal bottom member oscillated approximately 1 cm. above the curved bottom surface. Observation after two hours revealed that most settled particles were within 20 cm. (to both sides) of the bottom centerline of the tank. Two rapid oscillations resuspended or redistributed most of these particles.

This experiment indicated that a routine of slow with periodic fast oscillation, with the horizontal bottom member set slightly above the curved bottom surface, resulted in cyclic accumulation and resuspension of particles. This is one of a plurality of appropriate regimes for bottom-dwelling stages, such as shrimp post-larvae.

Industrial Applicability

The invention described herein is useful in the rearing of aquatic species including shrimp larvae, post-larvae, other aquatic species larvae and juveniles.

Equivalents

Those skilled in the art will recognize or be able to ascertain, using no more than routine experimentation, many equivalents to the specific embodiments of the invention described herein. Such equivalents are intended to be encompassed by the following claims.

I claim:

1. An apparatus for rearing aquatic species comprising, in combination:
   a. tank means for containing a supply of water sufficient to rear said aquatic species, said tank means having substantially vertical side walls having bottom portions thereof joined by a bottom surface arcuate in shape;
   b. a bottom member extending horizontally along the bottom surface of said tank means;
   c. means for mounting the bottom member to said tank means for oscillating motion in close proximity to said arcuate bottom surface; and
   d. means for driving said bottom member in an oscillating manner whereby the bottom member sweeps along the arcuate bottom surface of said tank means to a point adjacent where said arcuate bottom surface joins the bottom portions of said vertical side walls thereby resuspending inert food particles contained at the bottom of said tank means.

2. An apparatus of claim 1 wherein said horizontal bottom member additionally includes means for aerating water contained in said tank means.

3. An apparatus of claim 2 wherein said bottom member additionally includes means to remove water from said tank means.

4. An apparatus of claim 2 wherein said bottom member additionally includes means to add water to said tank means.

5. A method for rearing aquatic species, comprising:
   a. providing tank means with a supply of water sufficient to rear said aquatic species, said tank means having substantially vertical side walls having bottom portions joined by a bottom surface arcuate in shape; and
   b. moving a bottom member extending horizontally along the bottom surface of said tank means in close proximity thereto in an oscillating manner along the arcuate bottom surface of said tank means to a point adjacent where said arcuate bottom surface joins the bottoms of said vertical side walls to thereby resuspend inert food particles at the bottom of said tank means.

* * * * *